United States Patent
O'Toole et al.

(10) Patent No.: US 11,676,129 B2
(45) Date of Patent: *Jun. 13, 2023

(54) OFFLINE BILL SPLITTING SYSTEM

(71) Applicant: PAYPAL, INC., San Jose, CA (US)

(72) Inventors: Christopher Diebold O'Toole, Sunnyvale, CA (US); Yu Tang, San Jose, CA (US); Bryant Genepang Luk, San Jose, CA (US); Robert He, San Jose, CA (US); Jennifer Tatiana Brenner, San Jose, CA (US)

(73) Assignee: PayPal, Inc., San Jose, CA (US)

(*) Notice: Subject to any disclaimer, the term of this patent is extended or adjusted under 35 U.S.C. 154(b) by 96 days.

This patent is subject to a terminal disclaimer.

(21) Appl. No.: 17/208,674

(22) Filed: Mar. 22, 2021

(65) Prior Publication Data

US 2021/0248584 A1 Aug. 12, 2021

Related U.S. Application Data

(63) Continuation of application No. 14/284,790, filed on May 22, 2014, now Pat. No. 10,956,894.

(51) Int. Cl.
*G06Q 40/00* (2023.01)
*G06Q 20/32* (2012.01)
*G06Q 20/22* (2012.01)
*G06Q 20/10* (2012.01)

(52) U.S. Cl.
CPC ......... *G06Q 20/325* (2013.01); *G06Q 20/102* (2013.01); *G06Q 20/22* (2013.01); *G06Q 20/223* (2013.01); *G06Q 20/326* (2020.05)

(58) Field of Classification Search
None
See application file for complete search history.

(56) References Cited

U.S. PATENT DOCUMENTS

| | | |
|---|---|---|
| 4,949,380 A | 8/1990 | Chaum |
| 9,262,754 B1 | 2/2016 | Jawharkar |
| 2003/0158751 A1 | 8/2003 | Suresh |
| 2006/0116913 A1 | 6/2006 | Hansan |
| 2008/0021822 A1 | 1/2008 | Hinton |
| 2009/0030846 A1 | 1/2009 | Martinez-Miranda |
| 2009/0112747 A1 | 4/2009 | Mullen |

(Continued)

OTHER PUBLICATIONS

Wikipedia, the free encyclopedia; AirDrop; Jul. 20, 2011; 3 pages; http:en.wikipedia.org/wiki/AirDrop.

*Primary Examiner* — Olabode Akintola
(74) *Attorney, Agent, or Firm* — Haynes and Boone, LLP

(57) ABSTRACT

Systems and method for splitting a bill offline include detecting one or more local devices using local wireless communications provided by a peer-to-peer communication module. At least one payer device of the one or more local devices is selected for apportioning a primary bill. An offline payment authorization is then received from each at least one payer device through local wireless communications provided by the peer-to-peer communication module. When an Internet connection is later detected, the system provider connects to the Internet and sends the offline payment authorization received from each at least one payer device to a payment provider device over the Internet. The payment provider device may then transfer funds from account(s) of the at least one payer device to the account of the system provider.

20 Claims, 16 Drawing Sheets

(56) References Cited

U.S. PATENT DOCUMENTS

| | | | |
|---|---|---|---|
| 2010/0082481 A1* | 4/2010 | Lin | G06Q 40/00 |
| | | | 705/41 |
| 2010/0262538 A1 | 10/2010 | Rosenberger | |
| 2010/0312700 A1* | 12/2010 | Coulter | G06Q 20/108 |
| | | | 705/42 |
| 2011/0035662 A1* | 2/2011 | King | G06F 40/169 |
| | | | 715/273 |
| 2011/0270749 A1 | 11/2011 | Bennett | |
| 2012/0095787 A1 | 4/2012 | Davis | |
| 2012/0130889 A1 | 5/2012 | Lyons | |
| 2012/0136780 A1 | 5/2012 | El-Awady | |
| 2012/0166332 A1* | 6/2012 | Naaman | G06Q 20/3278 |
| | | | 705/40 |
| 2012/0259779 A1 | 10/2012 | Bharghavan | |
| 2013/0041824 A1 | 2/2013 | Gupta | |
| 2013/0085931 A1 | 4/2013 | Runyan | |
| 2013/0151405 A1* | 6/2013 | Head | G06Q 20/32 |
| | | | 705/41 |
| 2013/0179336 A1 | 7/2013 | Lyons | |
| 2014/0351118 A1 | 11/2014 | Zhao | |

\* cited by examiner

| | |
|---|---|
| APPETIZER | 7.99 |
| SALAD 1 | 4.99 |
| SOUP | 3.99 |
| SALAD 2 | 4.99 |
| ENTRÉE 1 | 12.99 |
| ENTRÉE 2 | 15.99 |
| ENTRÉE 3 | 18.99 |
| ENTRÉE 4 | 25.99 |
| DRINK 1 | 4.99 |
| DRINK 2 | 1.99 |
| DRINK 3 | 4.99 |
| DRINK 4 | 4.99 |
| DESSERT 1 | 5.99 |
| DESSERT 2 | 6.99 |
| COFFEE 1 | 1.99 |
| COFFEE 2 | 1.99 |
| SUBTOTAL | 129.84 |
| TAX | 10.72 |
| TOTAL | 140.55 |

PAYER DEVICE 400

FIGURE 4

OFFLINE BILL SPLITTING SYSTEM

CROSS REFERENCE TO RELATED APPLICATION

The present invention is a Continuation of U.S. patent application Ser. No. 14/284,790, filed May 22, 2014, which is incorporated herein by reference in its entirety.

BACKGROUND

Field of the Invention

The present invention generally relates to mobile payments and more particularly to a bill splitting system for use in making mobile payments to a payee offline.

Related Art

More and more consumers are purchasing items and services over electronic networks such as, for example, the Internet. Consumers routinely purchase products and services from merchants and individuals alike. The transactions may take place directly between an on-line merchant or retailer and the consumer, and payment is typically made by entering credit card or other financial information. Transactions may also take place with the aid of an on-line or mobile payment server provider such as, for example, PayPal, Inc. of San Jose, Calif. Such payment service providers can make transactions easier and safer for the parties involved. Purchasing with the assistance of an on-line or mobile payment service provider from the convenience of virtually anywhere using a mobile device is one main reason why on-line/mobile purchases are growing very quickly.

Typically, mobile payments are conducted between one payer and one payee and involve the payer receiving a bill or invoice from the payee and then providing full payment for the bill or invoice over the Internet. However, in some situations, a bill or invoice may need to be 'split' or divided up for payment by a plurality of payers. For example, a plurality of customers may order items together at a restaurant, and those orders may be recorded for the plurality of customers as a group and presented in a single bill to the plurality of customers. The payment of such a bill raises a number of issues.

Conventionally, mobile payments for a bill that includes items to be paid for by a plurality of customers is accomplished by one or more of the customers apportioning the bill amongst the plurality of customers, and then each customer using their payer devices to contact the payment service provider over an Internet connection to provide the payment service provider instructions to transfer funds from their respective payment accounts to a payment account of the payee. As such, each of the plurality of customers that are responsible for the bill is able to pay the payee for their portion of the bill from their respective payment account. However, such mobile payment systems require an Internet connection, as communication with the payment service provider through an Internet connection is necessary to transmit the instruction to make the payment from each customer payment account to the payment account of the payee. These limitations result in the inability to quickly and easily split a bill using mobile payer devices when an Internet connection is unavailable or those mobile payer devices are otherwise offline.

Therefore, what is needed is an offline bill splitting system.

BRIEF DESCRIPTION OF THE FIGURES

FIG. 4 is a front view illustrating an embodiment of a payer device displaying a primary bill;

Figure 1:
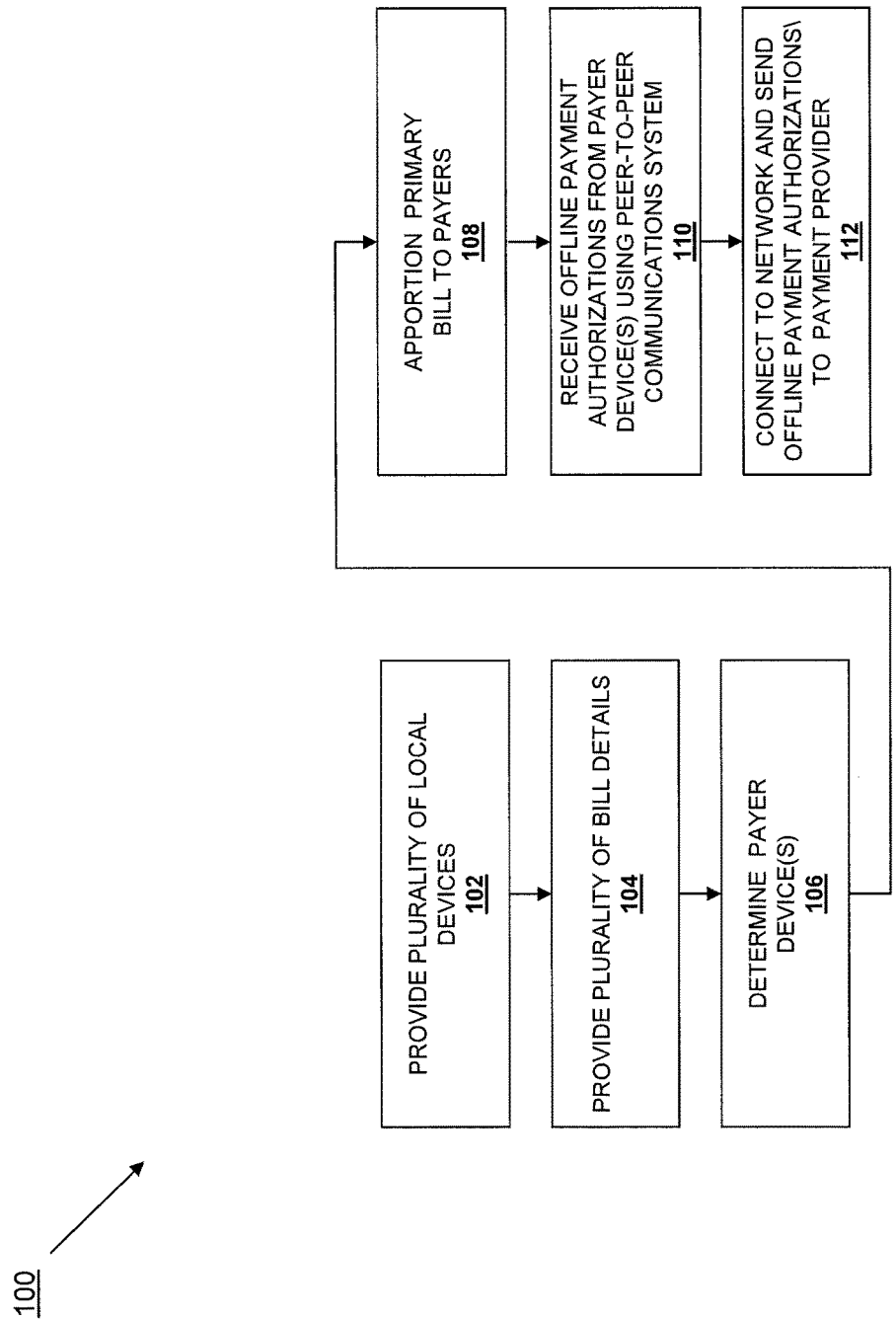
FIG. 1 is a flow chart illustrating an embodiment of a method for splitting a bill offline.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for splitting a bill and receiving payment for at least a portion of that bill in an offline transaction or otherwise without a connection to the Internet. An assignable digital primary bill may be provided that includes items ordered by each of a plurality of payers. A peer-to-peer communications system in a system provider device (which may be a payer device of one of the payers, a payee device of a payee, etc.) may then be used to provide local wireless communications that are used to detect one or more local devices, and at least one payer device (corresponding to payers that ordered items on the primary bill) may be selected for apportioning the primary bill between the payers. Each of the items (or portions of the items) on the primary bill may then be assigned to one or more of the plurality of payers to produce a plurality of secondary bills that each correspond to a respective payer. The payers may use their respective payer device to transmit offline payment authorizations to the system provider device using the local wireless communications provided by the peer-to-peer communication system. When an Internet connection is available, the system provider device may connect to the Internet and transmit each offline payment authorization received from the other payers to a payment provider device, and the payment provider device may then use the offline payment authorizations to transfer funds from payment accounts of the payers to a payment account of the user of the system provider device.

Figure 2:
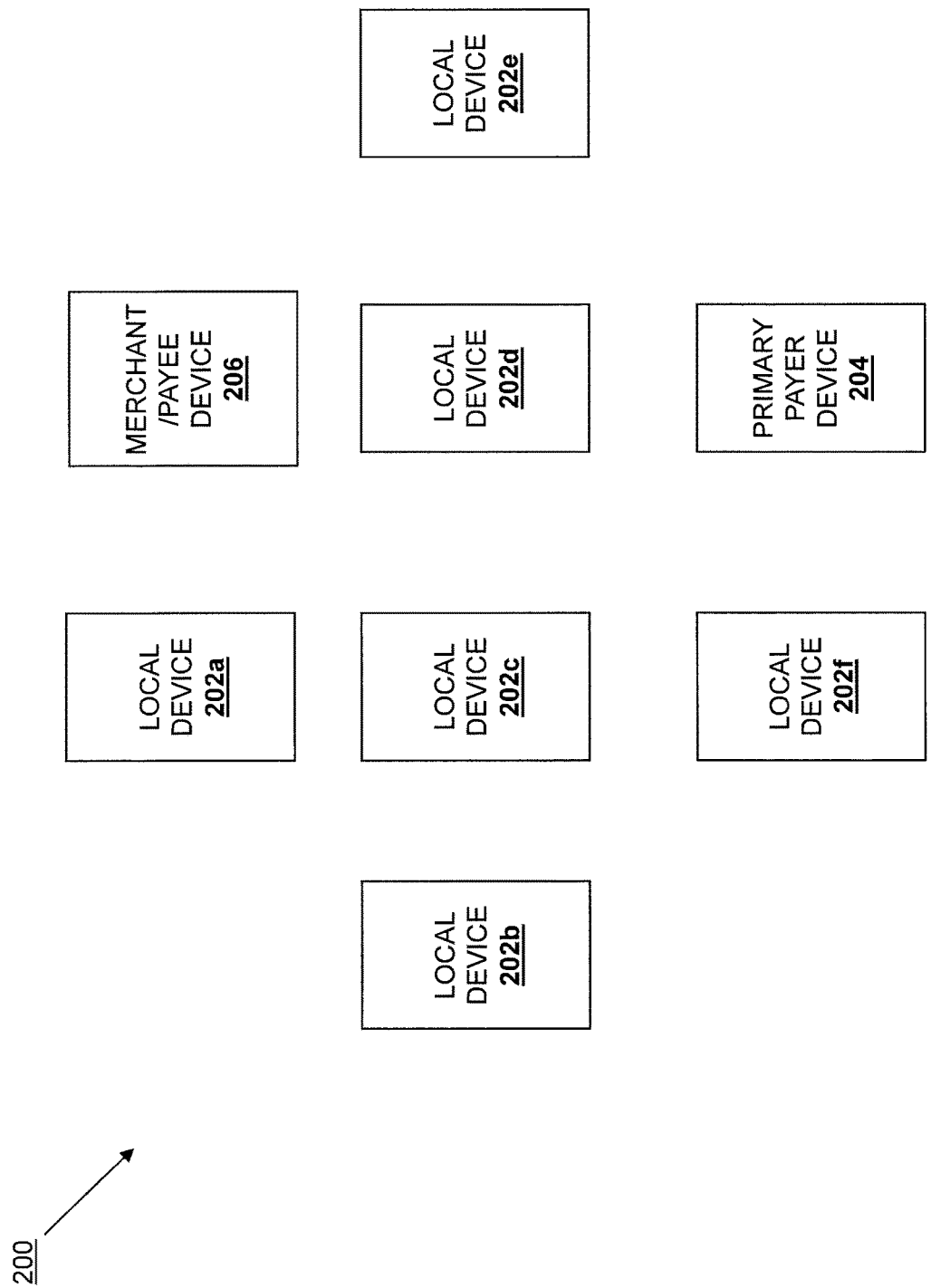
FIG. 2 is a schematic view illustrating an embodiment of an offline bill splitting system.

Referring now to FIGS. 1 and 2, a method 100 for splitting a bill offline is illustrated. In the embodiments discussed below, a plurality of payers order items at a restaurant that are included on a primary bill that is then split between the payers and paid for, at least in part, offline. However, the offline bill splitting systems and methods of the present disclosure may be used for bills or combined payments for a plurality of payers to any of a wide variety of payees, including a plurality of tickets purchased for a show, movie, sporting event, etc.; groceries purchased roommates; a bar tab; and/or a variety of other combined payment situations known in the art. In some of the embodiments discussed below, a payer associated with one of the plurality of payer devices pays for multiple portions of the primary bill, and their associated payer device operates as a system provider device that may receive the details of the primary bill, apportion the primary bill between the plurality of payers, receive offline payment authorizations, and/or submit the offline payment authorizations to a payment provider device. In some of the embodiments discussed below, a merchant/payee includes a payee device that operates as a system provider device that may receive the details of the primary bill, apportion the primary bill between the plurality of payers, receive offline payment authorizations, and/or submit the offline payment authorizations to a payment provider device. As such, the term "system provider" and "system provider device" may refer to one of the payers or the merchant/payee in the different embodiment discussed below.

Furthermore, the offline bill splitting systems and methods as discussed below as including a payment provider that may be a payment service provider such as, for example, PayPal Inc. of San Jose, Calif. However, other payment providers such as, for example, account providers including credit account providers, bank account providers, and/or other payment account providers known in the art may be the payment provider and or operate with other account holders to perform the functions of the payment provider in the systems and methods discussed below. As such, references to a payment provider may include a payment service provider, an account provider, and/or other entities known in the art that operate to transfer funds between payment accounts. In embodiments where the payment provider is a payment service provider, the payment service provider may provide payment service accounts to each of the payers (and in some embodiments, the merchant/payee) that are linked with payment accounts that are provided by account providers and/or the payment service provider itself. The payment service provider may then operate to transfer funds from payment accounts associated with a first payment service account to payment accounts associated with a second payment service account in response to payment requests from the payer associated with the first payment service account.

In a specific embodiment, the payment provider may provider the payers (and in some embodiments, the merchant/payee) with payment applications that may be executed by the payer devices (and in some embodiments the merchant/payee devices) discussed below to perform the functions discussed below. Those payment applications may thus be linked to the payment service accounts of the payers (and in some embodiment, the merchant/payee) and may require user credentials (e.g., a username, a passcode, etc.) in order to access the payment application to perform the functions discussed below.

The method 100 begins at block 102 where a plurality of local devices are provided. FIG. 2 illustrates an offline bill splitting system 200 that includes a plurality of local devices 202a, 202b, 202c, 202d, 202e, and 202f In the method 100 discussed below, the bill splitting system 200 is described as being used to split a bill between a plurality of payees at a restaurant or other merchant physical location. However, one of skill in the art will recognize that the present disclosure is not so limited, and a variety of other situations that involve the splitting of a bill or invoice between a plurality of payees will fall within its scope. In the illustrated embodiment, a group of payers may include a primary payer having a primary payer device 204 and other payers having payer devices that may be any of the local devices 202a-f, and that group of payers may have ordered one or more items at a restaurant or other merchant physical location that may include one or more merchant/payee devices 204.

Figure 3:
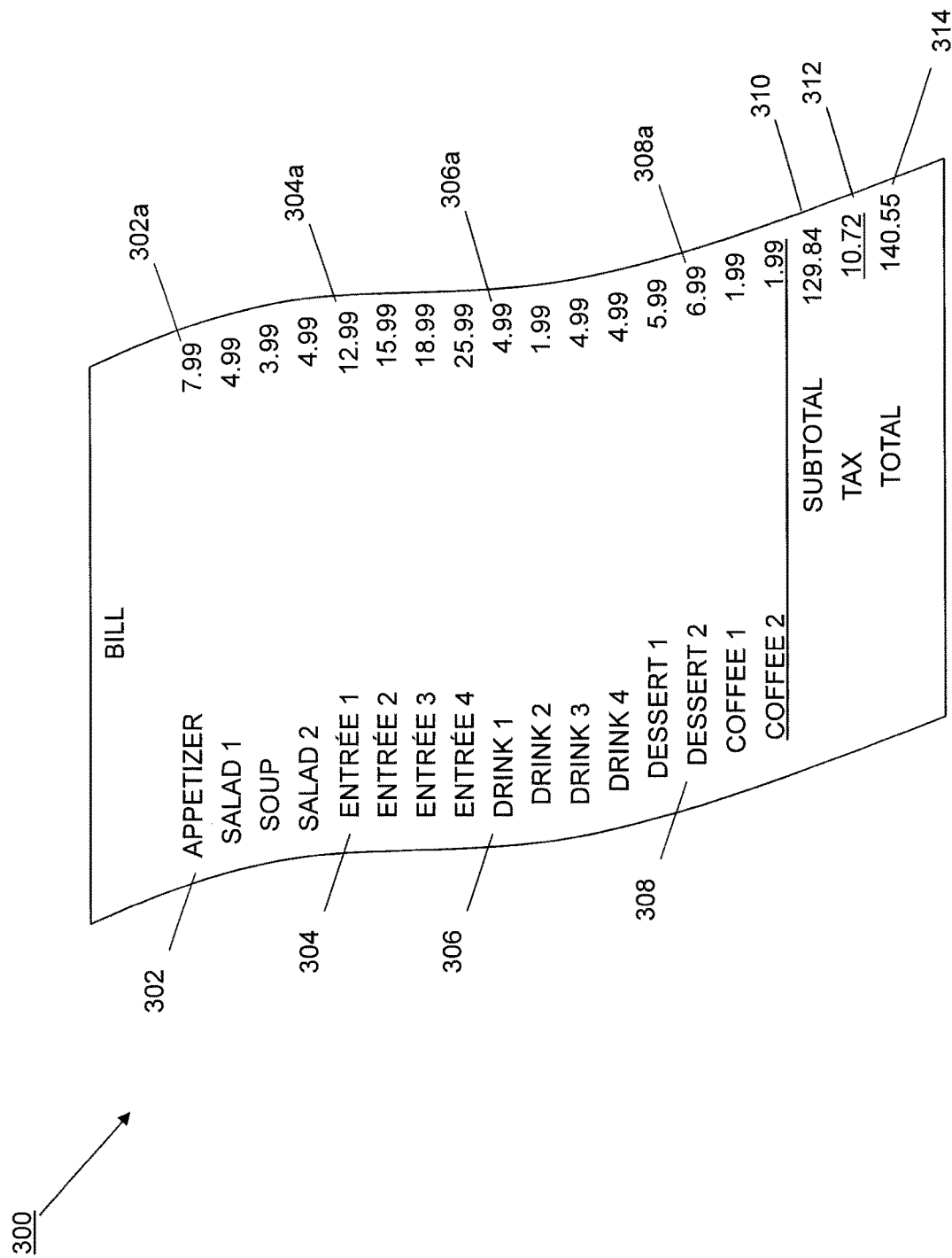
FIG. 3 is a front view illustrating an embodiment of a physical bill.

Referring now to FIGS. 1, 3, and 4, the method 100 then proceeds to block 104 where a plurality of bill details are provided. In some embodiments, a plurality of bill details associated with a primary bill that includes items ordered by the plurality of payers, discussed above, are provided on the primary payer device 204. For example, the plurality of payers at the restaurant may be presented with a physical bill 300 that includes a plurality of items, such as the items 302, 304, 306, and 308, that were ordered by the plurality of payers. Each item is associated on the physical bill 300 with a cost, such as the costs 302a, 304a, 306a, and 308a. In additional, a subtotal 310, which may be the sum of the costs of the items, is included on the physical bill 300, along with a tax 312 associated with the subtotal 310 (e.g., 8.25% of the total in the illustrated embodiment) and a total 314 that may be the sum of the subtotal 310 and the tax 312. While a particular physical bill has been described and illustrated, one of skill in the art will recognize that a variety of physical bills and/or invoices may replace the physical bill 300 without departing from the scope of the present disclosure. The primary payer device 204 may then capture an image of the physical bill 300 using, for example, a camera on the primary payer device 204 as is known in the art, and then use optical character recognition techniques to generate a primary bill that is an assignable digital representation of the physical bill 300, discussed in further detail below. In some embodiments, any of the plurality of payer devices associated with payers that are responsible for the physical bill 300 may capture the image of the physical bill 300 and generate the primary bill in substantially the same manner as described above.

FIG. 4 illustrates an embodiment of a payer device 400 that includes a display device 402 that is displaying a primary bill 404. The primary bill 404 includes a plurality of items, such as the items 406, 408, 410, and 412, which may correspond to the items 302, 304, 306, and 308, respectively, on the physical bill 300. Each item is associated on the primary bill 404 with a cost 406a, 408a, 410a, and 412a, which may correspond to the costs 302a, 304a, 306a, and 308a, respectively, on the physical bill 300. In additional, a subtotal 414 that may corresponds to the subtotal 310 on the physical bill 300 is included on the primary bill 404, along with a tax 416 that may correspond to the tax 312 on the physical bill 300, and a total 418 that may correspond to the total 314 on the physical bill 300. While a particular primary bill 404 has been described and illustrated, one of skill in the art will recognize that a variety of primary bills and/or invoices that may be displayed on a payer device may replace the primary bill 404 without departing from the scope of the present disclosure.

In some embodiments, the primary bill 404 may be provided on the primary payer device 204 and/or the other payer devices in response to those payer devices capturing an image of the physical bill 300 and using optical character recognition techniques to generate the primary bill 404, as discussed above. In other embodiments, the primary bill 404 may be generated by the merchant/payee device 206 and then provided to the primary payer device 204 and/or any of the other payer devices 202a-f using, for example, local wireless communications provided using the peer-to-peer communication system discussed below. In yet other embodiments, the primary bill 404 may be generated by the merchant/payee device 206 and provided for display on the merchant/payee device 206, similarly as illustrated for the payer device 400, without providing the primary bill to a payer device (e.g., such that the primary bill 404 may be apportioned using the merchant/payee device 206, discussed in further detail below).

Figure 5:
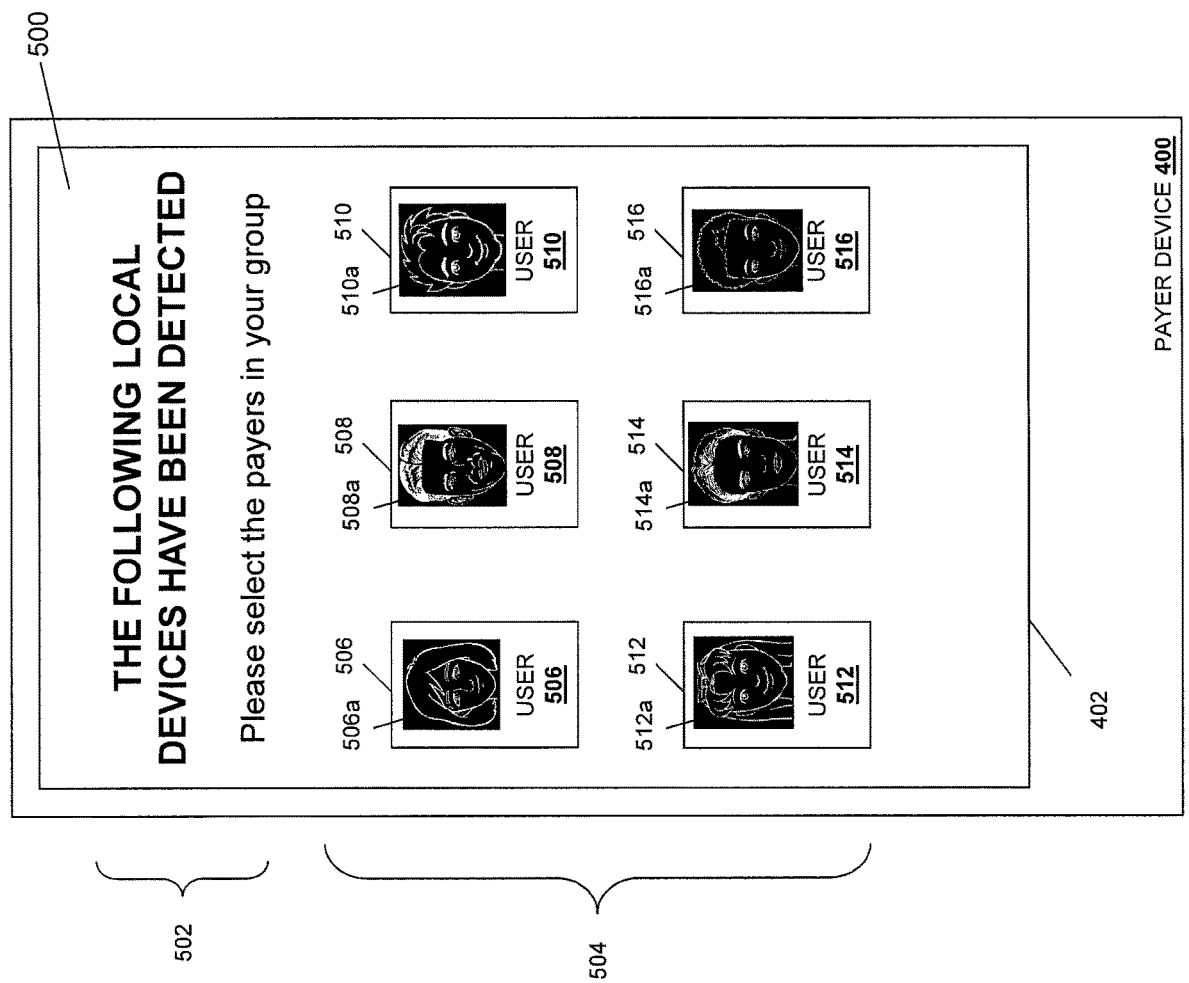
FIG. 5 is a schematic view illustrating an embodiment of a payer device being used to determine payers.

Referring now to FIGS. 1, 2, and 5, the method 100 then proceeds to block 106 where payer devices are determined. The offline bill splitting systems and methods of the present disclosure allow a bill to be split between a plurality of payers when an Internet connection is unavailable for one or more payer devices and/or merchant/payee devices and/or when those devices are otherwise offline. In some embodiments, the Internet connection is unavailable for each of the payer devices and the merchant/payee device. However, in some embodiments, the Internet connection may only be unavailable for some subset of the payer devices and merchant/payee device or for the system provider device itself. For example, when the system provider device is the primary payer device 204 of the payer that is paying the merchant/payee for multiple portions or the entirety of the primary bill, discussed in further detail below, the Internet connection may be unavailable for at least the primary payer device 204. In another example when the system provider device is the merchant/payee device 206, the Internet connection may be unavailable for at least the merchant/payee device 206. The systems and methods of the present disclosure provide for offline bill splitting in such unavailable Internet connection situations by utilizing peer-to-peer communications systems in the system provider device and the payer devices to allow for the payers to pay or reimburse the primary payer offline for payment of multiple portions or the entirety of the primary bill, or to allow for the payers to pay the merchant/payee offline for the primary bill.

The peer to peer communication modules discussed below may include a wide variety of local wireless technologies known in the art, including but not limited to Bluetooth communications technologies, Bluetooth Low Energy (BLE) communications technologies, Near Field Communications (NFC) technologies, WiFi direct technologies, combinations thereof, and/or a variety of other local wireless technologies known in the art that allow computing devices to communicate directly without the need for a wireless router or Internet connection. Each of the local devices 202a-f, the primary payer device 204, and the merchant/payee device may include the peer to peer communication modules such that each of those devices may communicate with each other as described herein when an Internet connection is unavailable for at least one of the devices.

At block 106, the system provider device may operate its peer-to-peer communications system to determine local devices. In an embodiment of block 106, referring to FIG. 2, the system provider device (e.g., the primary payer device 204 in some embodiments, the payee device 206 in some embodiments) operates its peer to peer communication module to detect the local devices that are within range of the peer to peer communication module. For example, the system provider device may operate a BLE communication technology that is part of its peer to peer communication module to communicate with the local devices 202a-f and, in some embodiments, the primary payer device 204 (e.g., using the BLE communication technology in their respective peer to peer communication modules) in order to detect those devices. In a specific example, the primary payer device 204 may operate a payment application, which may have been launched to capture or receive the primary bill 404, in order to detect the local devices 202a-f. In another specific example, the merchant/payee device 206 may operate a payment application, which may have been launched to determine or send the primary bill 404, in order to detect the local devices 202a-f and the primary payer device 204.

FIG. 5 illustrates an embodiment of the payer device 400 including the display 402 displaying a local device detection screen 500. While the payer device 400 is illustrated and described as a payer device such as the primary payer device 204, in some embodiments the payer device 400 may be the merchant/payee device 206 (e.g., when the merchant/payee device 206 performs block 106 of the method 100). The local device detection screen 500 includes an information section 502 that informs the user that local devices have been detected, and that one or more payers that are part of the group of payers responsible for the primary bill 404 should be selected. In the illustrated embodiment, the local device detection screen 500 also includes a detected device section 504 that, for each local device detected, includes an indicator for the local device, an identifier for the user of the local device, and an image of the user of the local device. For example, the local device detection screen 500 includes local device indicators 506, 508, 510, 512, 514, and 516, identifiers for their associated users (e.g., users 506, 508, 510, 512, 514, and 516, respectively, which may have been retrieved through the communication with the local devices), and images for their associated users (e.g., images 506a, 508a, 510a, 512a, 514a, and 516a, respectively, which may have been retrieved through the communication with the local devices). While a specific example has been provided, one of skill in the art in possession of the present disclosure will recognize that any of a wide variety of local device information may be retrieved and displayed (or obfuscated for privacy reasons) on the local device detection screen 500 while remaining within the scope of the present disclosure.

The system provider device (e.g., the primary payer device 204 in some embodiments, the merchant/payee device 206 in some embodiments) may then be used to select the local devices indicators 506, 508, 510, 512, 514, and/or 516 for users that are payers that are responsible for some portion of the primary bill 504. In some embodiments, in response to selection of the local device indicators for the payers responsible for some portion of the primary bill 504, the system provider device then communicates with the selected local devices to indicate to those local devices that they have been selected as payer devices for splitting the primary bill 404. In some embodiments, the system provider device may use the same communication technology in its peer to peer communication module to communicate with the local devices as was used to detect the local devices. However, in some embodiments, the system provider device may use a different communication technology in its peer to peer communication module to communicate with the local devices than was used to detect the local devices. For example, the system provider device may have used the BLE communication technology to detect the local devices, and then may switch to a WiFi direct communication technology for the further communications with the local devices/payer devices discussed below. As is known in the art, WiFi direct communication technologies allow a first device to create a WiFi network that other devices can use to connect to and communicate with the first device without a need for a separate wireless router or Internet connection.

In some embodiments, the communication with each of the selected local devices to indicate to those local devices that they have been selected as payer devices for splitting the primary bill 404 may include an security identifier that is required for further communications with the system provider device such that only local devices that are selected using the system provider device can communicate about the primary bill 404. Each selected local device may respond to the communication from the system provider device to confirm that they are payer devices associated with payers that are responsible for some portion of the primary bill 404 (such devices are referred to henceforth as "payer devices" to distinguish them from local devices of users that are not responsible for some portion of the primary bill 404), and those responses may include the security identifier received from the system provider device to create a local networked system that is restricted to the system provider device and the payer devices. In some embodiments, the security identifier may be included in any further local wireless communications between the system provider device and the payer devices.

In some embodiments, the determination of the payers devices may be performed over a Bump™-type network by 'bumping' or physically engaging the system provider device (the primary payer device 204 in some embodiments, the merchant/payee device 206 in some embodiments) and the local devices of the one or more payers that are responsible for at least some portion of the primary bill 404 in order to exchange information, as described in co-pending U.S. application Ser. No. 10/570,454, filed on Sep. 30, 2009, and co-pending U.S. application Ser. No. 12/570,544, filed on Sep. 30, 2009, the disclosures of which are incorporated herein by reference. Furthermore, a variety of other communication techniques known in the art may be used to determine payer devices in the offline bill splitting system 200. Information exchanged between the payer devices may include payer information such as payer contact information, any information needed to display the local device indicators 506-516 and related information, and any information needed to send a secondary bill to a particular payer device (discussed in further detail below).

Figure 6A:
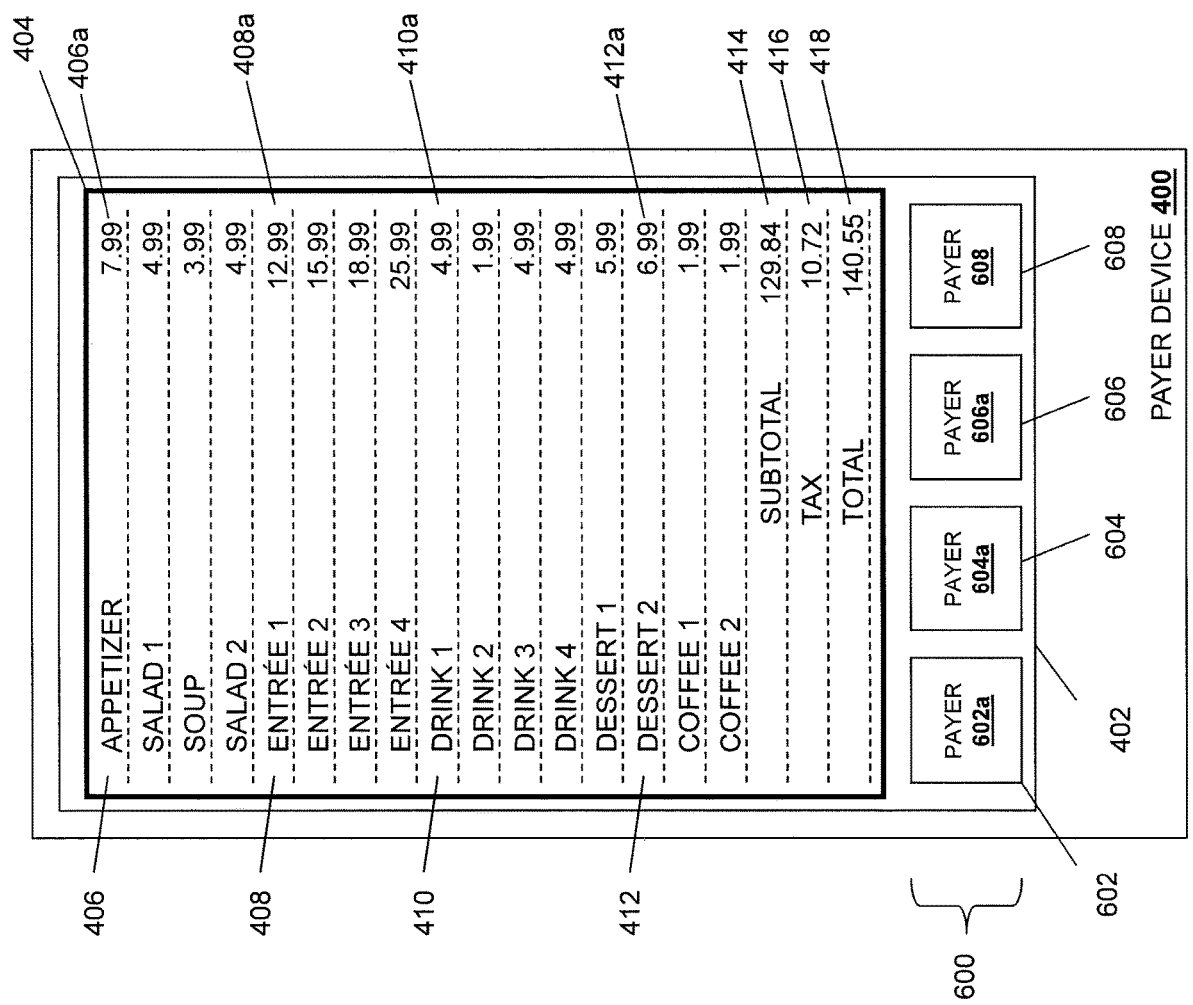
FIG. 6a is a schematic view illustrating an embodiment of a payer device being used to display a primary bill and a plurality of payers that are responsible for the primary bill.

Referring now to FIGS. 1, 6a, 6b, and 7, the method 100 then proceeds to block 108 where the primary bill is apportioned to payers. In an embodiment of block 108, the system provider device may display the primary bill 404 discussed above along with payer device identifiers for the payer devices determined at block 106 of the method 100. For example, FIG. 6a illustrates the payer device 400, which may be the primary payer device 204, displaying the primary bill 404 along with a payer device section 600 that includes payer device indicators 602, 604, 606, and 608 for payer devices that were determined at block 106 and that are associated with payers 602a, 604a, 606a, and 608a, respectively, that are responsible for at least a portion of the primary bill 404. However, as discussed above, while the payer device 400 is illustrated and described below as the primary payer device 204, the payer device 400 may also be the payee device 206 in embodiments where the payee device 206 performs block 108 of the method 100.

In an embodiment, the optical character recognition techniques performed on the physical bill 300 provide the primary bill 404 that is a digital representation of the physical bill 300 and includes a plurality of assignable items (e.g., the assignable items 406, 408, 410, and 412) with associated assignable costs (e.g., the assignable costs 406a, 408a, 410a, and 412a) that correspond to the items and costs on the physical bill 300. In an embodiment, elements of the primary bill 404 (e.g., the items, costs, subtotal, tax, and/or total) may be edited using the payer device 400 to, for example, correct any errors that may result in the use of optical character recognition techniques on the physical bill 300 to provide the primary bill 404. In an embodiment, when a plurality of payer devices generate the primary bill 404 and/or select the payer devices, those payer devices may sync their respective primary bills 404 with each other to crosscheck and/or ensure the information on the primary bill 404 (e.g., the assignable items, assignable costs, subtotal, the tax, and/or the total) and/or the payer device indicators 602, 604, 606, and 608 are correct and/or coincide with each other on each of the payer devices. In an embodiment, the primary payer device 204 may generate and send the primary bill 404 and the payer device indicators 602, 604, 606, and 608 to the other payer devices following block 106 of the method 100.

Figure 8A:
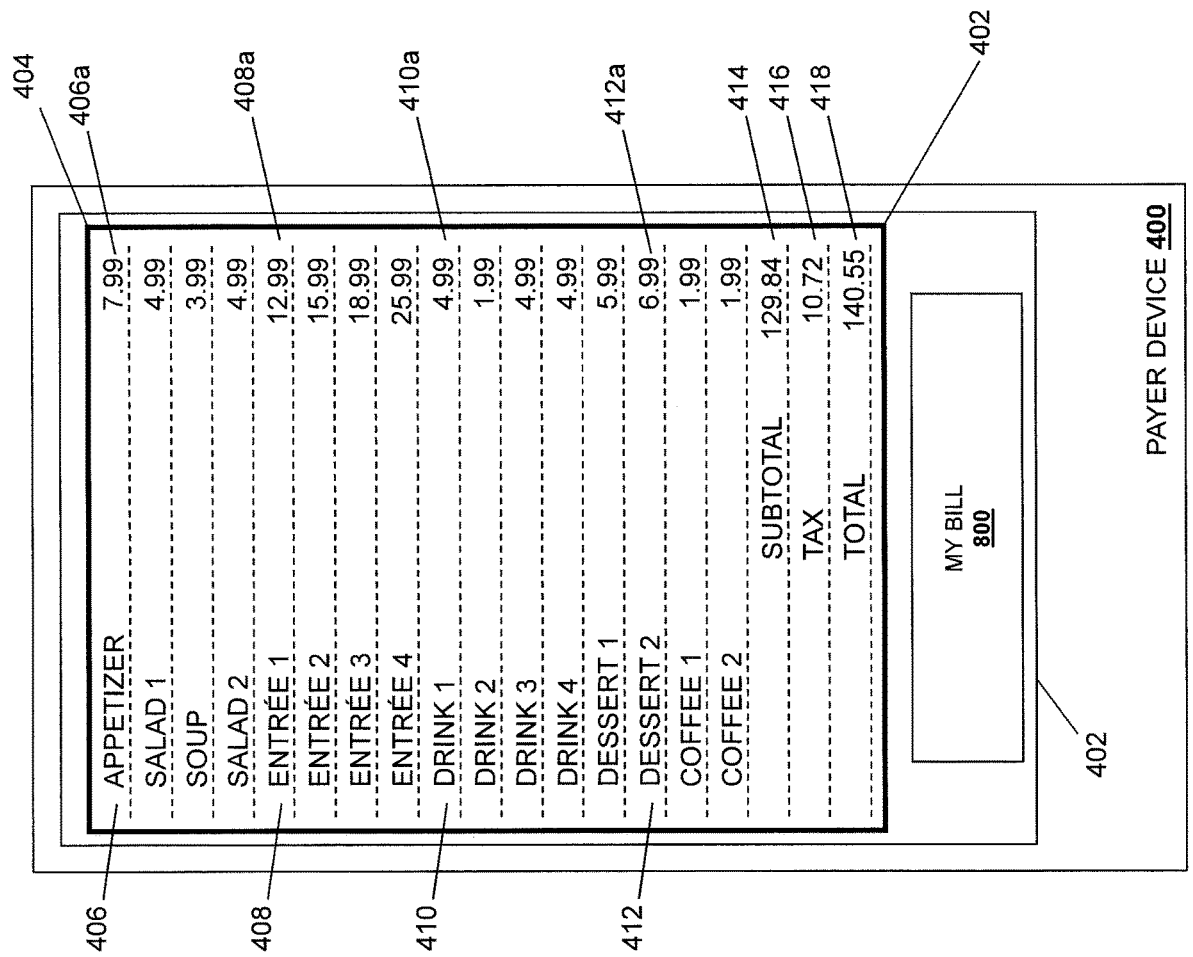
FIG. 8a is a schematic view illustrating an embodiment of a payer device being used to display a primary bill.

In an alternative embodiment, illustrated in FIG. 8a, and the primary bill 404 may be sent to the payer device(s) from the merchant/payee device 206. For example, a plurality of payers may order items, and those items may be included in an electronic primary bill 404 by the merchant/payee. The merchant/payee may then use the merchant/payee device 206 to select payers, for example, substantially as described above with reference to FIG. 5, and send the primary bill 404 to one or more of the payer devices associated with those payers. As can be seen in FIG. 8a, the payer device 400 may display the primary bill 404 on the display 402, and may also include a my-bill icon 800. Each of the payer devices belonging to the payers responsible for the primary bill 404 may receive the primary bill 404 such that it is displayed along with the my-bill icon 800 on their payer device in substantially the same manner as is illustrated for payer device 400 in FIG. 8a.

Figure 6B:
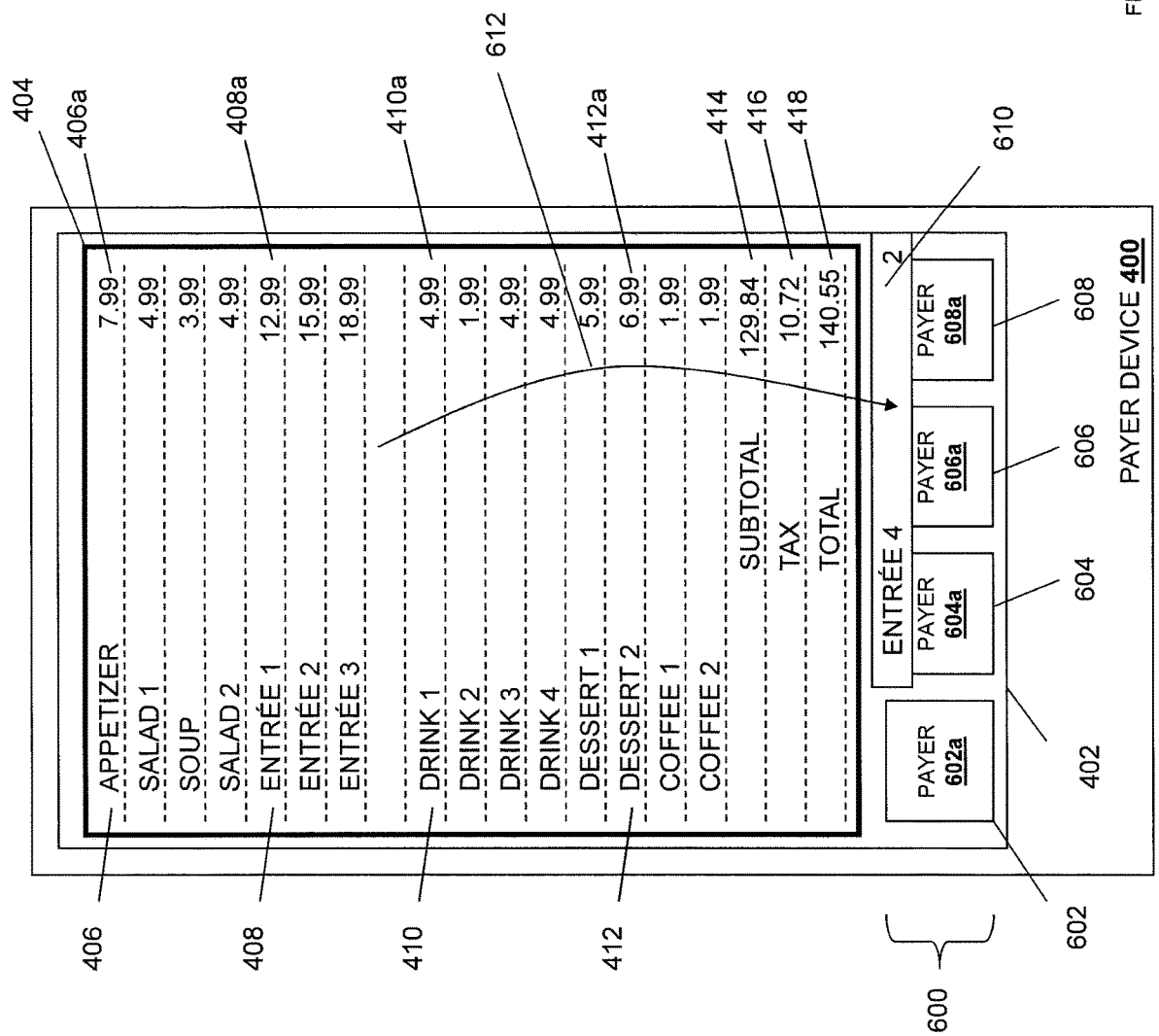
FIG. 6b is a schematic view illustrating an embodiment of a payer device being used to apportion an item in a primary bill to a payer.

As illustrated in FIG. 6b, at block 108 the system provider device (a payer device 400 such as the primary payer device 204 in the illustrated embodiment, but which may be the payee device 206 in other embodiments) is used to apportion items in the primary bill to payers to create at least one secondary bill. In an embodiment, the display 402 may be a touch input device that allows a payer to select one of the assignable item 406, 408, 410, or 412 (e.g., ENTRÉE 4 in the illustrated embodiment) by touching that assignable item 610, dragging that item 610 across the display (as indicted by arrow 612) and assigning that assignable item 610 to one of the payers by 'dropping' that assignable item (e.g., releasing the touch input on the display 402) on one of the payer device indicators 602, 604, 606, or 608. Each assignable item may be assigned to one of the payers in such a manner. While a touch input device ahs been described to discuss the assignment of assignable items and costs in the primary bill 404 to different payers, one of skill in the art will recognize that a variety of other methods may be used to assign the assignable items and costs to the payers without departing from the scope of the present disclosure (e.g., using non-touchscreen input devices such as a mouse, trackball, keyboard, voice commands, etc.). In an embodiment, any of the assignable items and costs may be further split between two or more payers (e.g., by inputting a percentage of the item to assign to each of a plurality of the payers, by inputting an amount of the assignable costs (e.g., the assignable costs 406a, 406b, 406c, and 406d) to assign to each of a plurality of the payers, etc.). Furthermore, multi-touch inputs may be used to split an assignable item between two or more payers such as, for example, by using a single touch to select an assignable item, and then multiple touches to separate the assignable item into two or more equal amounts and then dragging respective multiple touches and dropping into the appropriate payer device indicator 602, 604, 606, or 608s.

Figure 8B:
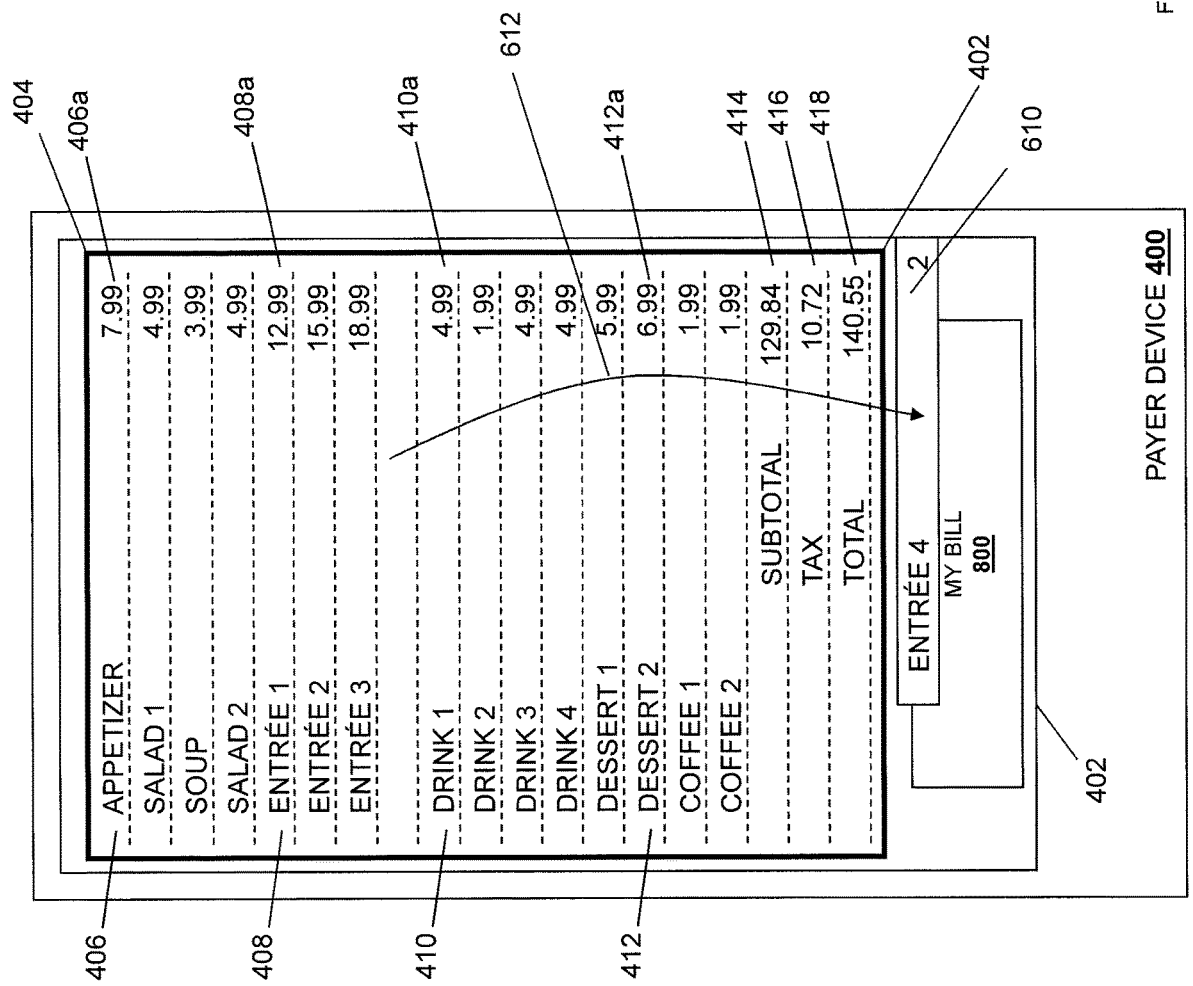
FIG. 8b is a schematic view illustrating an embodiment of a payer device being used to apportion an item in a primary bill to themselves.

In an alternative embodiment, illustrated in FIG. 8b, the primary bill 404 has been sent to each of the plurality of payer devices of payers responsible for the primary bill 404. As discussed above, a touch input allows a payer to select one of the assignable item 610 (e.g., ENTREE 4 in the illustrated embodiment) by touching that assignable item 610, dragging that item 610 across the display (as indicted by arrow 612), and assigning that assignable item to themselves by 'dropping' that assignable item on the my-bill icon 800. A payer may assign themselves each assignable item they are responsible for in such a manner, and each assignable item on the primary bill 404 may be assigned using the plurality of payer devices that received the primary bill 404. In an embodiment, as items are assigned on one payer device, the primary bill 404 is updated on the other payer devices that received the primary bill 404 (e.g., via local wireless communications provided by the peer to peer communication modules) such that the assigned items are no longer displayed on the primary bill 404 on any of the payer devices.

Figure 7:
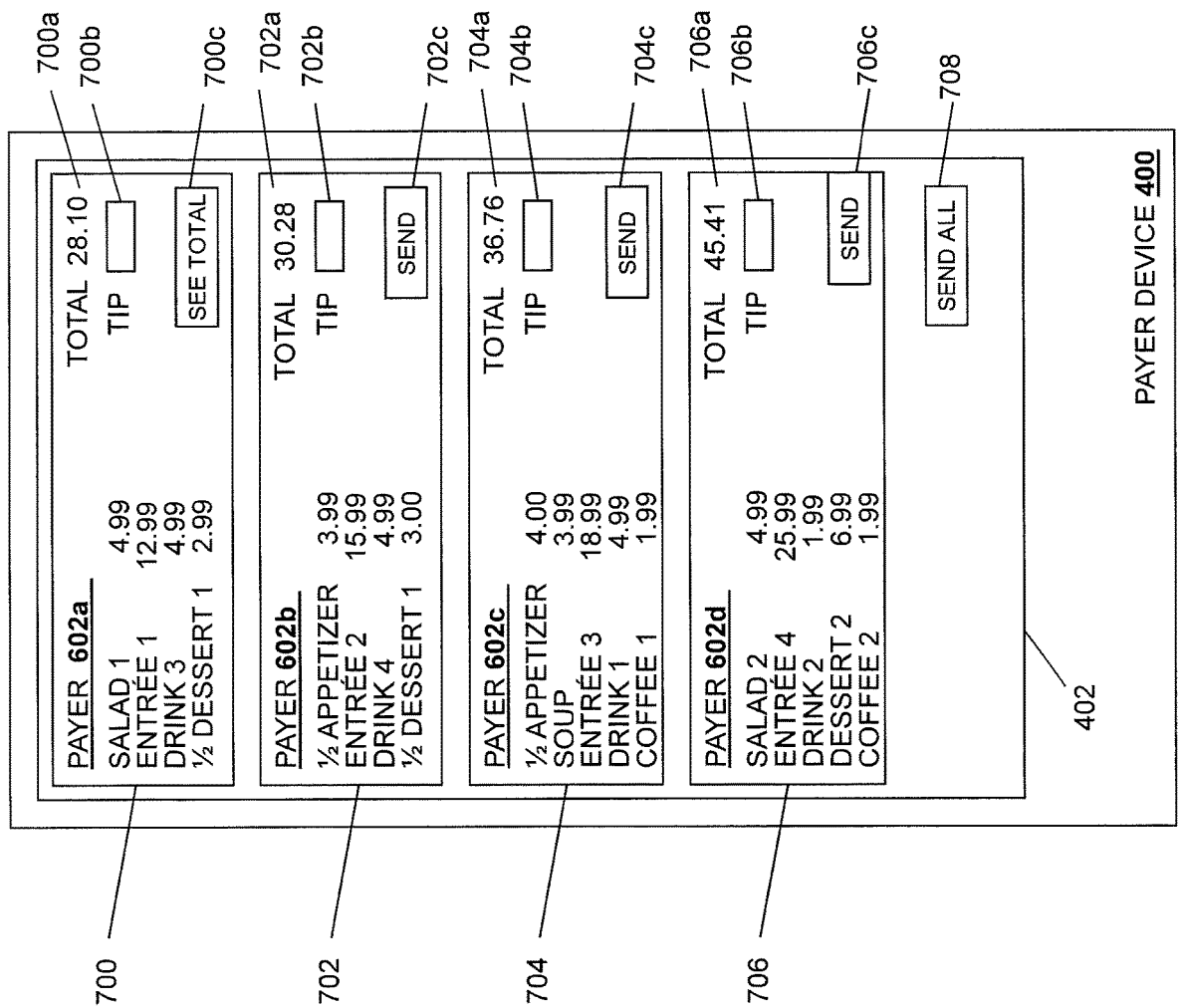
FIG. 7 is a schematic view illustrating an embodiment of a payer device being used to display a plurality of secondary bills.

Referring now to FIG. 7, a plurality of secondary bills 700, 702, 704, and 706 may be generated from the assignment of assignable items and associated assignable costs discussed above. Each of the secondary bills 700, 702, 704, and 706 includes the plurality of the assignable items and assignable costs assigned to the payers 602a, 602b, 602d, and 602e, as discussed above with reference to FIG. 6b. Furthermore, the bill splitting system 200 may determine a tax that is based on the sum of the assignable costs for the assignable items for each secondary bill and use that tax to provide totals 700a, 702a, 704a, and 706a for each respective secondary bill 700, 702, 704, and 706. For example, the payer device(s) may determine an appropriate tax rate from the primary bill 404 (e.g., by dividing the tax 416 by the subtotal 414), and then apply that tax rate to the sum of the costs associated with each secondary bill. In an embodiment, each secondary bill 700, 702, 704, and 706 also includes a tip input 700b, 702b, 704b, and 706b. In an embodiment, the tip inputs 700b, 702b, 704b, and 706b may include tip amounts that are automatically calculated based on a percentage of each respective total 700a, 702a, 704a, and 706a, or the tip inputs 700b, 702b, 704b, and 706b may be provided by the payers. In an embodiment, the payer device (s) may check the assignable items/costs assigned and/or the totals 700a, 702a, 704a, and 706a determined for the secondary bills 700, 702, 704, and 706 against the assignable items, assignable costs, subtotal 414, tax 416, total 418, and/or other information on the primary bill 404 to ensure that payment of the secondary bills 700, 702, 704, and 706 will provide full payment of the primary bill 404.

In embodiments where the system provider device (e.g., the primary payer device 204 in some embodiments, the payee device 206 in some embodiments) performs block 108, the secondary bills may be sent to the other payer devices by the system provider device using, for example, respective send buttons 702c, 704c, and 706c or a send-all button 708. When the system provider device is the primary payer device 204, the primary payer device 204 may also be used to check a total amount owed by the payer associated with the primary payer device 204 using the see total button 700c.

Figure 9:
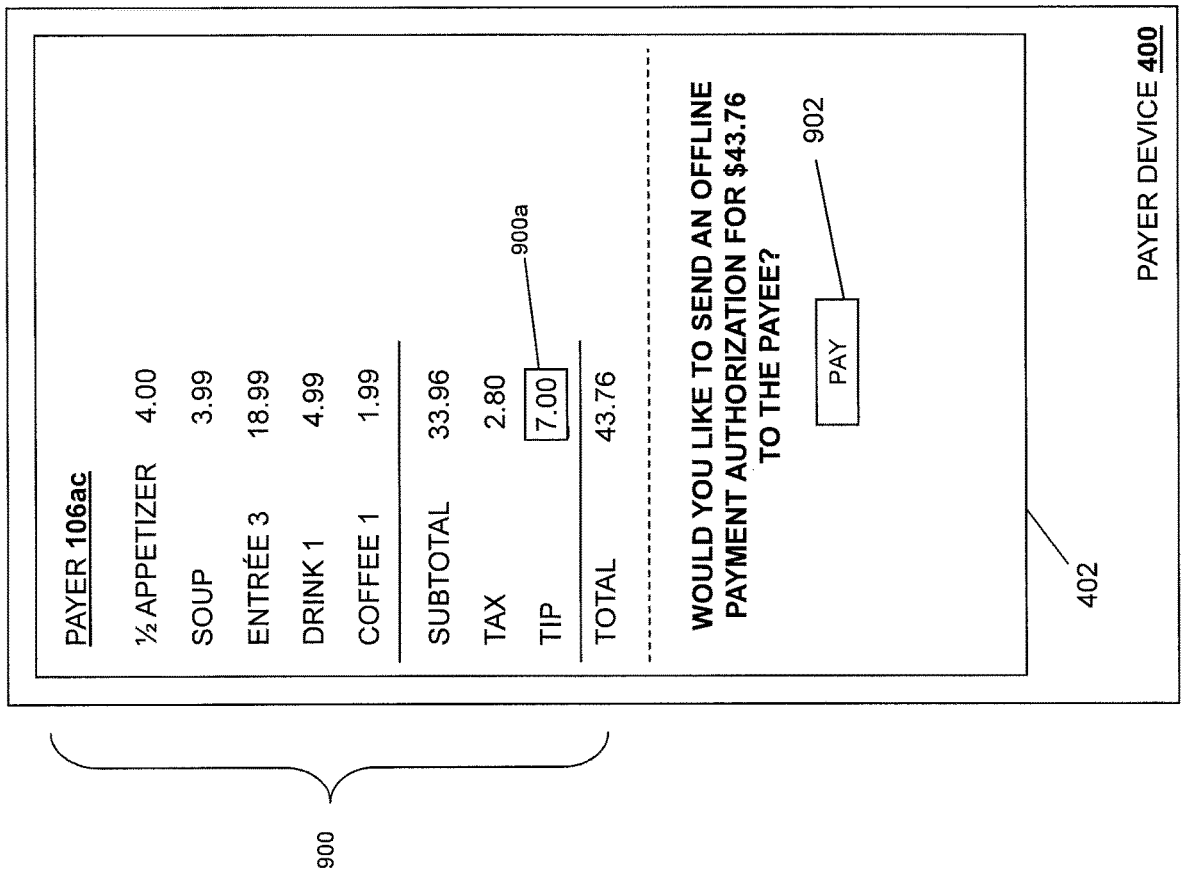
FIG. 9 is a schematic view illustrating an embodiment of a payer device being used to display a secondary bill.

Following the apportioning of the primary bill 404, each payer device may be presented with a secondary bill. FIG. 9 illustrates the payer device 400 including the display 402 displaying a secondary bill 900 that includes the details of the items from the primary bill that the payer of the payer device 400 was apportioned, as well as a tip input 900a in which that payer may provide a tip such that a total amount owed is determined. The secondary bill 900 illustrated in FIG. 9 may be provided to each payer device upon the payer of the primary payer device 204 or the payee of the payee device 406 apportioning the primary bill 404 at block 108 and sending each secondary bill to the other payers, or upon the payers apportioning the primary bill 404 themselves.

The method 100 then proceeds to block 110 where offline payment authorizations are received using peer to peer communication modules. Following block 108, each of the payer devices (including the primary payer device 204 in embodiments where the system provider device is the payee device 206) may respectively display the secondary bill 900 that includes the items from the primary bill 404 that were apportioned to the payer associated with that payer device, as illustrated on the payer device 400 of FIG. 9. The payer may use the payer device 400 to confirm that the items apportioned to them on the secondary bill 900 are correct, add a tip in the tip input 900a, and select a pay button 902. If the items apportioned to the payer on the secondary bill 900 are incorrect, input options (not illustrated) may be provided that allow the payer to edit the items in the secondary bill 900, send the secondary bill 900 back to the system provider device, designate an item for another payer in the group such that item is removed from the secondary bill 900 and provided on a secondary bill currently being displayed to the other payer on their payer device, and/or otherwise allow the payer to correct the secondary bill 900.

Figure 10:
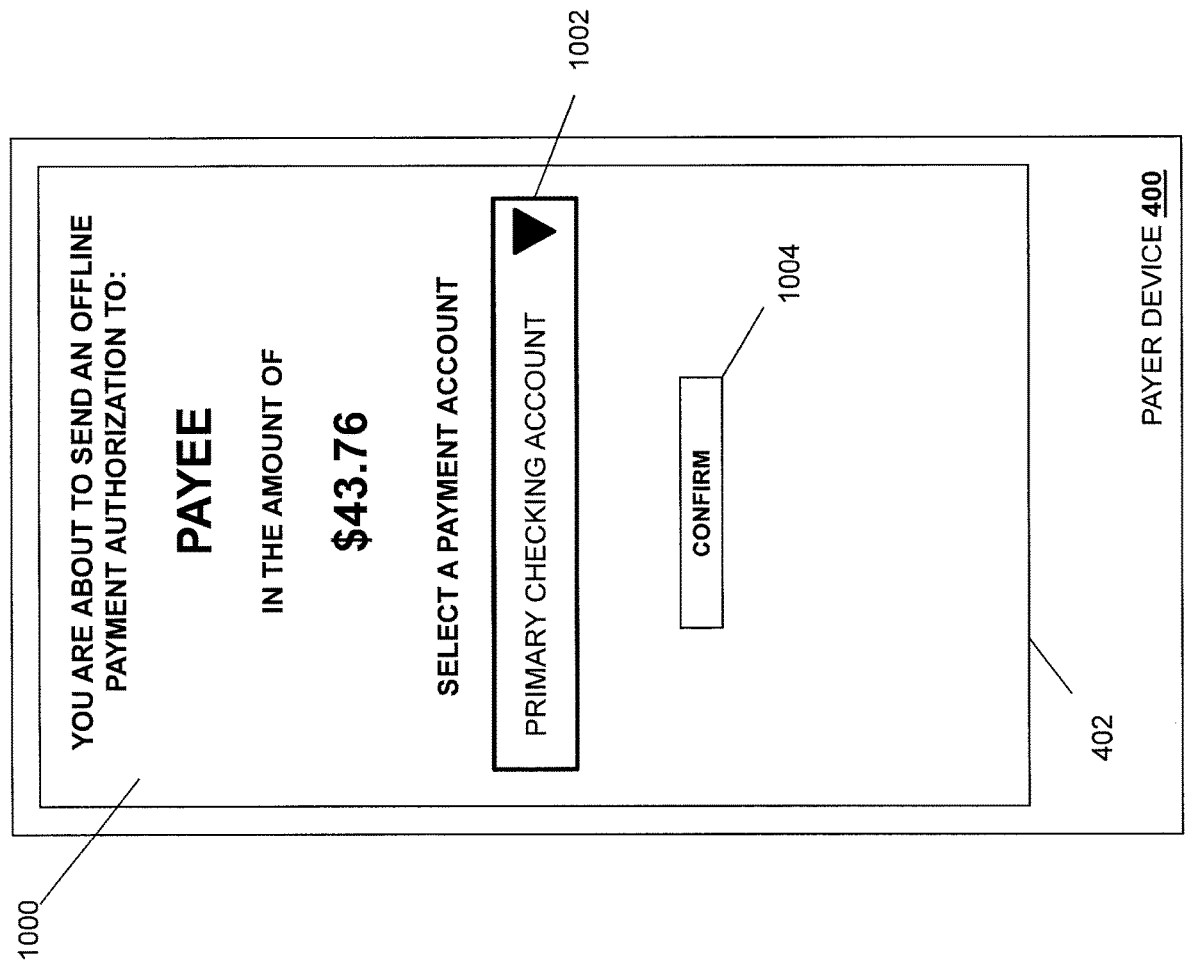
FIG. 10 is a schematic view illustrating an embodiment of a payer device being used to a confirmation screen for paying a secondary bill.

Referring now to FIG. 10, in response to selecting the pay button 902 associated with the secondary bill 900 illustrated in FIG. 9, a confirmation screen 1000 is provided that used to confirm that the payer associated with the payer device 400 is about to send an offline payment authorization for a specified amount to a specified payee (which may be the payer associated with the primary payer device 204 in some embodiments, and which may be the merchant/payee associated with the merchant/payee device 206 in some embodiments). The confirmation screen 1000 may allow the payer to select a payment account in a payment account selector 1002 (e.g., the checking account in the illustrated embodiment), and select a confirm button if the payee, amount, and payment account are correct.

In response to selecting the confirm button 1004, the payer device 400 operates to create and send an offline payment authorization to the system provider device using the local wireless communications provided by the peer to peer communication modules in the system provider device and the payer device 400. In some embodiments, each payer device may include one or more authorization tokens that may be used to authorize an offline payment. For example, a payment provider may issue one or more authorization tokens to payers as part of a payment application that is provided for the payer devices and that is used to allow the payer devices to perform the functions discussed herein with regard to the offline bill splitting systems and methods. In an embodiment, the offline payment authorization may be created by encrypting and signing (using a private key associated with the payer) the authorization tokens and payment information confirmed by the payer (e.g., the payee identity, the payer identity, the amount of the payment, the payment account to be used to make the payment, and/or any other information associated with the payment), and that offline payment authorization may then be sent using the local wireless communications provided by the peer to peer communication modules in the payer device and the system provider device such that it is received by the system provider device.

As such, at block 110 of the method 100, the system provider device receives an offline payment authorization from each payer device over the local wireless communications provided by its peer to peer communication module. In some embodiments of block 110, the system provider device is the primary payer device 204 that receives offline payment authorizations from each of the payer devices associated with payers that are responsible for at least a portion of the primary bill 404. In those embodiments, the payer associated with the primary payer device 204 may make a payment to the merchant/payee for some or all of the primary bill 400 (i.e., the portion of the primary bill owed by that payer and the payers from which an offline payment authorization is (or will be) received) using a variety of payment methods. For example, the payer associated with the primary payer device 204 may pay for the entire amount of the primary bill 404 (or an amount that other payers in the group provide offline payment authorizations for reimbursement) using cash, a credit card, a debit card, a gift card, a check, and/or a variety of other conventional payment methods known in the art. In some examples, the payer associated with the primary payer device 204 may pay for the entire amount of the primary bill 404 (or an amount that other payers in the group provide offline payment authorizations for reimbursement) using the peer to peer communication module (e.g., to provide the merchant/payee with a single payment, when the other payer devices do not have the ability to pay the merchant/payee directly using the peer to peer communication modules, etc.)

In some embodiments of block 110, the system provider device is the merchant/payee device 206 that receives offline payment authorizations from each of the payer devices associated with payers that are responsible for at least a portion of the primary bill 404. In those embodiments, each payer may use their payer device to pay the merchant/payee directly for the amount of the primary bill 404 apportioned to them using the offline payment authorizations discussed above.

As discussed above, each of the offline payment authorizations include payment information that may be encrypted and signed using a private key of its associated payer. However, the payment amount associated with each offline payment authorization may be readable using the system provider device without decrypting the offline payment authorization. For example, the payment amount confirmed by each payer for each offline payment authorization may not be encrypted, may be included unencrypted along with the encrypted and signed information in the offline payment authorization, and/or may otherwise be readable by the system provider device such that the amount paid by each payer using the offline payment authorizations may be confirmed by the user of the system provider device (e.g., the payer associated with the primary payer device 204, the merchant/payee associated with the merchant/payee device 206). As such, the payer associated with the primary payer device 204 may use the offline payment authorizations received at block 110 to confirm that each of the other payers has reimbursed them an appropriate amount for payment of the primary bill 404, or the payee associated with the payee device 206 may use the offline payment authorizations received at block 110 to confirm that each of the other payers has paid the appropriate amount for the primary bill 404.

The method 100 then proceeds to block 112 where a network is connected to and the offline payment authorization(s) are submitted to a payment provider. In an embodiment, following receiving the offline payment authorizations from each of the payer devices (and in embodiments in which the primary payer device 204 is the system provider device, paying for some or all of the primary bill 404), the system provider device may detect an Internet connection and, in response, connect to the Internet. In some embodiments, the connection to the Internet may be in response to an instruction by a user of the system provider device, while in other embodiments, the system provider device may connect to the Internet automatically in response to detecting the Internet connection. Upon connecting to the Internet, the system provider device may operate to send the offline payment authorizations over the Internet to a payment provider. In some embodiments, the sending of the offline payment authorizations to the payment provider may be performed in response to an instruction by a user of the system provider device, while in other embodiments, the system provider device may send the offline payment authorizations to the payment provider automatically in response to connecting to the Internet.

As discussed above, the payment provider may be a payment service provider such as, for example, PayPal of San Jose, Calif.; account providers such as credit account providers, bank account providers, etc.; and/or a variety of other payment providers known in the art. Upon receiving the offline payment authorizations at block 112, the payment provider may use a payment provider device that operates to use the public keys associated with each payer that provided an offline payment authorization to decrypt that offline payment authorization, verify the authentication token included in that offline payment authorization, and retrieve the payment information. Upon verification of an offline payment authorization, the payment provider may then use the payment information to cause funds to be transferred from a payment account associated with the payer that provided the offline payment authorization to a payment account associated with the user of the system provider device (e.g., a payment account of the payer associated with the primary payer device 204 in some embodiments, or a payment account of the merchant/payee associated with the merchant/payee device 206 in some embodiments).

Thus, systems and methods have been described that provide for offline bill splitting between a plurality of payers responsible for a primary bill by using offline payment authorizations provided via peer to peer communication modules when an Internet connection is unavailable. The systems and methods allow a first payer in a group to pay for a bill and have the other payers in the group provide offline payment authorizations that may be used by the first payer to be reimbursed when an Internet connection is available, or to allow a merchant to receive offline payment authorizations from each of the payers in a group that are responsible for a bill and that may be used by the merchant to receive payment when an Internet connection is available. Using authorization tokens providing by a payment provider to each of the payers, as well as private/public key encryption, the offline payment authorizations provide a secure means for payers and payees to conduct a payment transaction offline and when an Internet connection is unavailable, and allow the payee to be ensured that they will be reimbursed later when an Internet connection becomes available.

Furthermore, as discussed above, in some embodiments only the system provider device may be unable to connect to the Internet. In those embodiments, the offline payment authorization may include a payment confirmation from the payment provider that is sent through the peer to peer communication modules from the payer devices to the system provider device. For example, the payer devices in the offline bill splitting system 200 may have access to the Internet while the system provider device may not. Upon receiving the secondary bill, that payer device may operate to transmit, to the payment provider device, a payment request to make a payment for the secondary bill to a system provider payment account of the system provider device. In response, the payment provider may transfer funds from the payer payment account to the system provider payment account, and send an offline payment confirmation for the payment request to the payer device. At block 110, the payer device may then forward that offline payment confirmation (the offline payment authorization) to the system provider device along with an authorization token.

Figure 11:
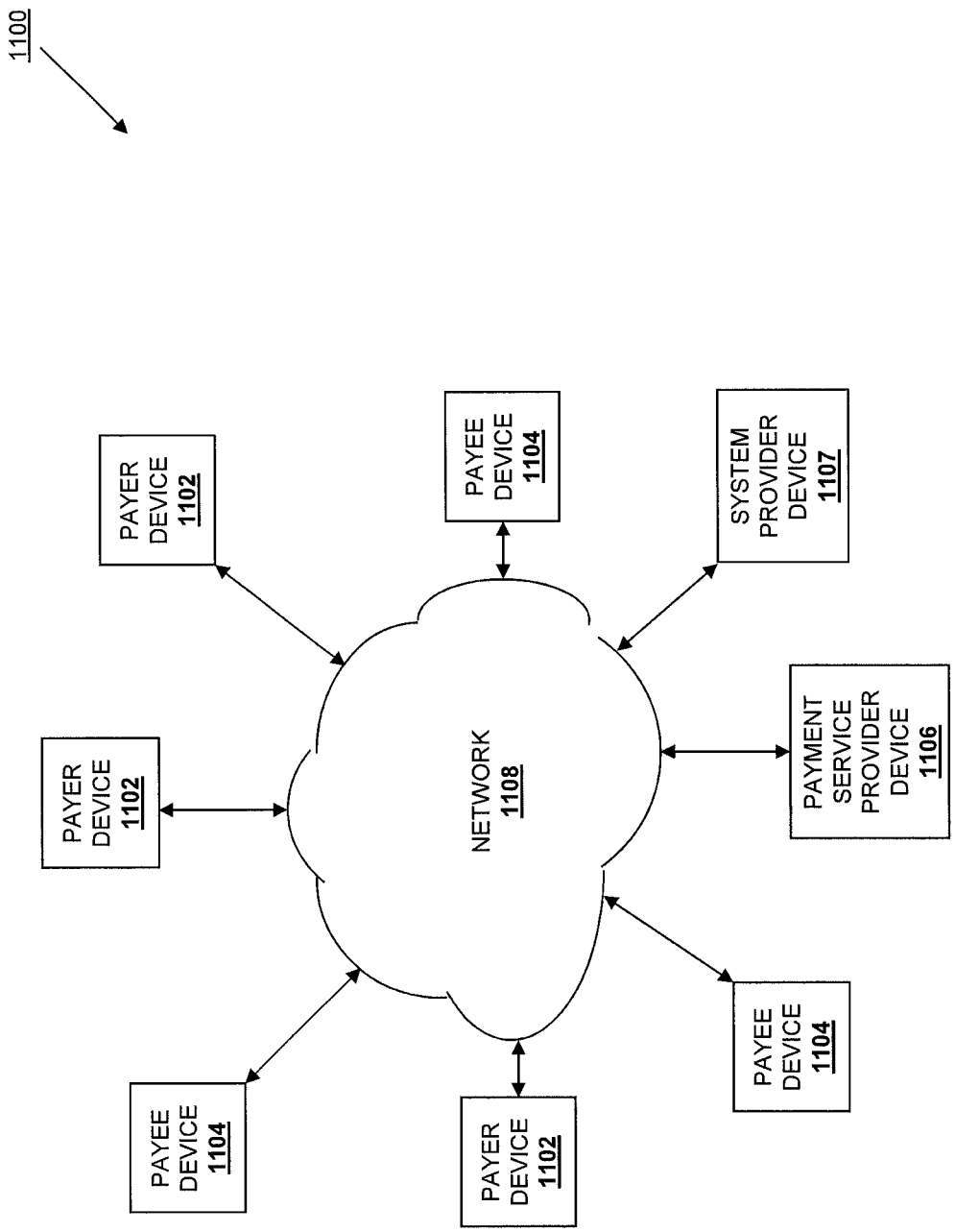
FIG. 11 is a schematic view illustrating an embodiment of a networked system used in an offline bill splitting system.

Referring now to FIG. 11, an embodiment of a networked system 1100 that may be used in the bill splitting system 200 is illustrated. The networked system 1100 includes a plurality of payer devices 1102, a plurality of payee devices 1104, a payment service provider 1106, and/or a system provider device 1107 in communication over a network 1108. The payer devices 102 may be any or all of the payer devices discussed above and may be operated by the payers discussed above. The payee devices 1104 may be any or all of the merchant/payee devices discussed above and may be operated by the merchant/payees discussed above. The payment service provider device 1108 may be any of the payment provider devices or payment service provider devices discussed above and may be operated by a payment service provider such as, for example, PayPal Inc. of San Jose, Calif. The system provider device 1107 may be any or all of the system provider devices discussed above and may be operated by the system providers discussed above The payer devices 102, payee devices 1104, payment service provider device 1106, and/or system provider device 1107 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1100, and/or accessible over the network 1108.

The network 1108 may be implemented as a single network or a combination of multiple networks. For example, in various embodiments, the network 1108 may include the Internet and/or one or more intranets, landline networks, wireless networks, and/or other appropriate types of networks.

The payer devices 1102 may be implemented using any appropriate combination of hardware and/or software configured for wired and/or wireless communication over network 1108. For example, in one embodiment, the payer devices 1102 may be implemented as a personal computer of a payer in communication with the Internet. In other embodiments, the payer devices 1102 may be a smart phone, laptop computer, tablet computer, and/or other types of computing devices known in the art.

The payer devices 1102 may include one or more browser applications which may be used, for example, to provide a convenient interface to permit the payer to browse information available over the network 1108. For example, in one embodiment, the browser application may be implemented as a web browser configured to view information available over the Internet.

The payer devices 1102 may also include one or more toolbar applications which may be used, for example, to provide payer-side processing for performing desired tasks in response to operations selected by the payer. In one embodiment, the toolbar application may display a user interface in connection with the browser application.

The payer devices 1102 may further include other applications as may be desired in particular embodiments to provide desired features to the payer devices 1102. In particular, the other applications may include a payment application for payments through the payment service provider device 1106. The other applications may also include security applications for implementing user-side security features, programmatic user applications for interfacing with appropriate application programming interfaces (APIs) over the network 1108, or other types of applications. Email and/or text applications may also be included, which allow the payer to send and receive emails and/or text messages through the network 1108. The payer devices 1102 include one or more user and/or device identifiers which may be implemented, for example, as operating system registry entries, cookies associated with the browser application, identifiers associated with hardware of the payer devices 1102, or other appropriate identifiers, such as a phone number. In one embodiment, the user identifier may be used by the payment service provider device 1106 to associate the payer with a particular account maintained by the payment service provider device 1106 as further described herein.

The payee devices 1104 may be maintained, for example, by an on-line merchant, digital goods seller, individual seller, and/or application developer offering various products and/or services in exchange for payment to be received over the network 1108. In this regard, the payee devices 1104 may include a database identifying available products and/or services (e.g., collectively referred to as items) which may be made available for viewing and purchase by the payer.

The payee devices 1104 may also include a checkout application which may be configured to facilitate the purchase by the payer of items. The checkout application may be configured to accept payment information from the payer and/or from the payment service provider device 1106 over the network 1108.

Figure 12:
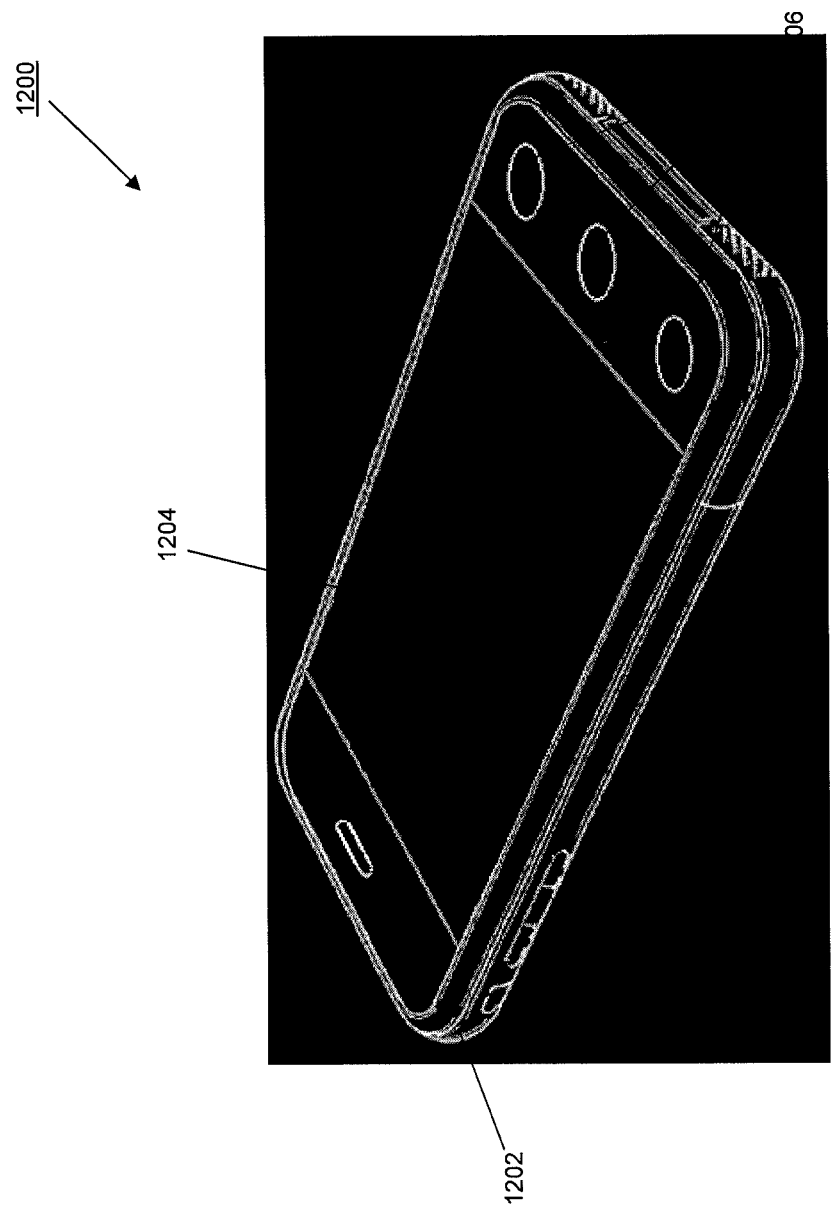
FIG. 12 is a perspective view illustrating an embodiment of a payer device.

Referring now to FIG. 12, an embodiment of a payer device 1200 is illustrated. The payer device 1200 may be any or all of the payer devices discussed above. The payer device 1200 includes a chassis 1202 having a display 1204 and an input device including the display 1204 and a plurality of input buttons 1206. One of skill in the art will recognize that the payer device 1200 is a portable or mobile phone including a touch screen input device and a plurality of input buttons that allow the functionality discussed above with reference to the method 100. However, a variety of other portable or mobile payer devices may be used in the method 100 without departing from the scope of the present disclosure.

Figure 13:
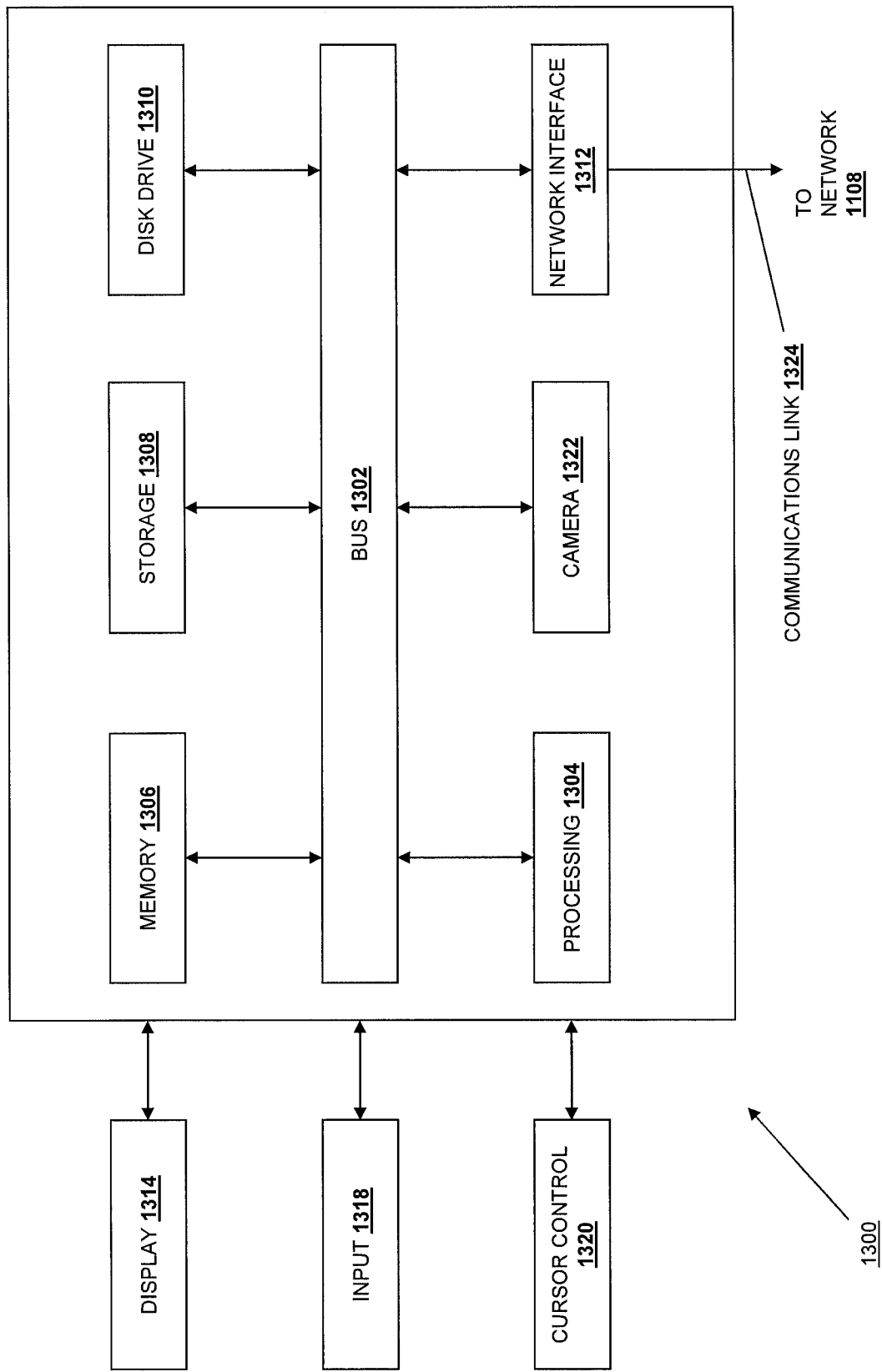
FIG. 13 is a schematic view illustrating an embodiment of a computing system.

Referring now to FIG. 13, an embodiment of a computer system 1300 suitable for implementing, for example, the payer devices, payee devices, payment service provider devices, and/or system provider devices discussed above, is illustrated. In various implementations, the payer device(s) may comprise a computing device (e.g., a computer, laptop, smart phone, PDA, etc.) capable of communicating through the network 1108 with the payee devices, payment service provider device, and/or system provider device. It should be appreciated that other devices utilized by payers, payees, payment providers, and system providers in the offline bill splitting system 200 may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), and/or a camera 1322. In one implementation, the disk drive component 1310 may comprise a database having one or more disk drive components.

In accordance with embodiments of the present disclosure, the computer system 1300 performs specific operations by the processor 1304 executing one or more sequences of instructions contained in system the memory component 1306, such as described herein with respect to the payer devices, the payee devices, the payment service provider device, and/or the system provider device discussed above. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 1108 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Figure 14:
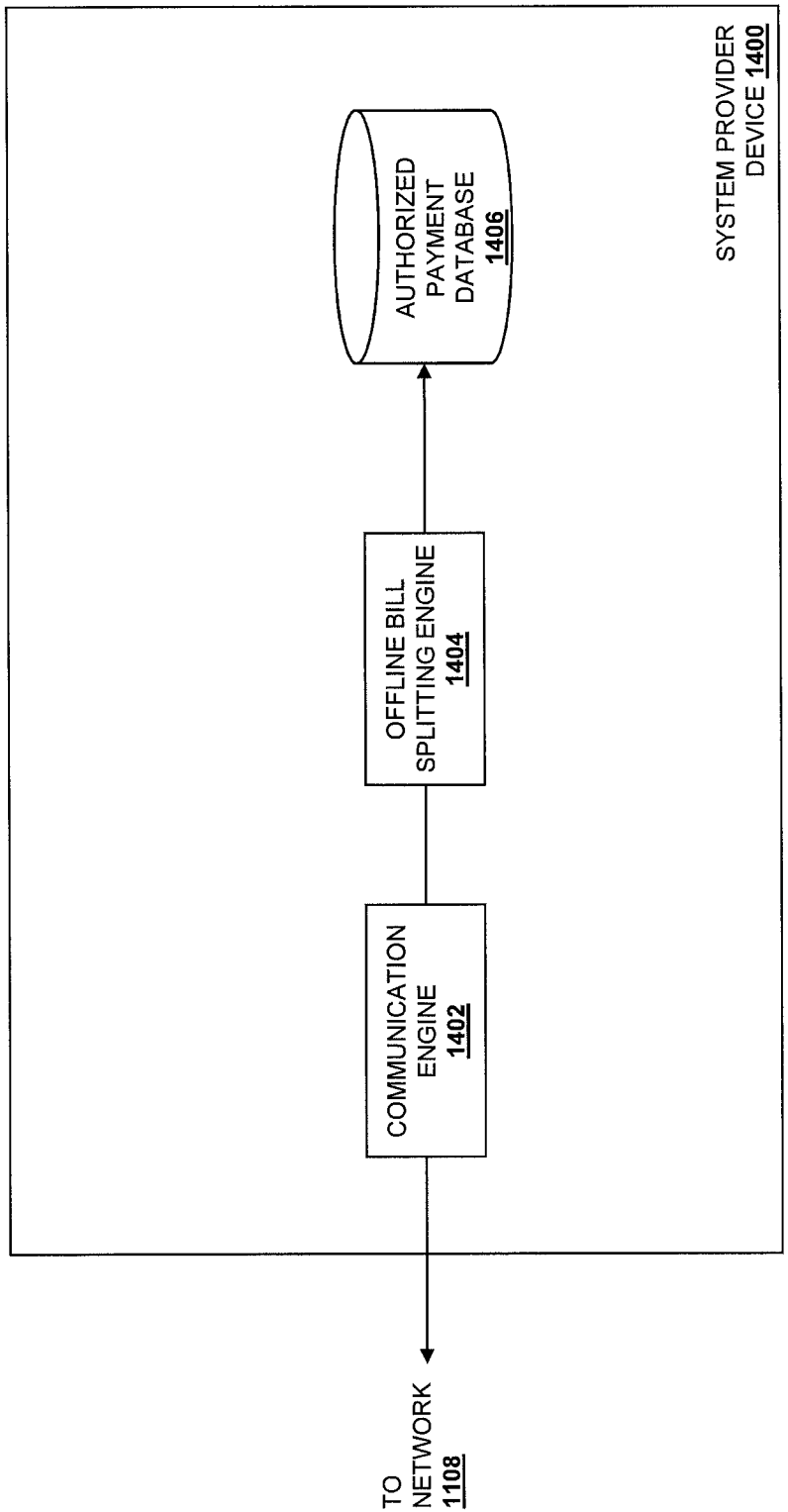
FIG. 14 is a schematic view illustrating an embodiment of a system provider device.

Referring now to FIG. 14, an embodiment of a system provider device 1400 is illustrated. The system provider device includes a communication engine 1402 that is coupled to the network 1108, and an offline bill splitting engine 1404 that is coupled to the communication engine 1402 and an authorized payment database 1406. The communication engine 1402 may be software or instructions stored on a computer-readable medium that allows the system provider device 1400 to send and receive information over the network 1108. The offline bill splitting engine 1404 may be software or instructions stored on a computer-readable medium that is configured to receive primary bill details, determine payer devices, apportion a primary bill, receive offline payment authorizations and store the offline payment authorizations in the authorized payment database 1406, provide offline payment authorizations from the authorized payment database 1406 over the Internet to payment provider, and/or perform any of the other functionality of the system provider devices discussed above.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payers and payees; however, a user or consumer can pay virtually, or otherwise interact with any type of recipient, including charities and individuals. The payment does not have to involve a purchase, but can be a loan, a charitable contribution, a gift, etc. Thus, payee as used herein can also include charities, individuals, and any other entity or person receiving a payment from a payee. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
one or more processors; and
one or more machine-readable storage media having instructions stored thereon that, in response to being executed by the one or more processors, cause the system to perform operations comprising:
receiving an image captured for a transaction via a first user device associated with a first user;
determining one or more user devices comprising a second user device associated with the transaction;
determining a portion of the transaction assigned to a second user associated with the second user device;
transmitting the portion of the transaction to the second user device;
receiving, from the second user device, an encrypted payment authorization token that authorizes payment to a user account with a payment provider server;
analyzing the encrypted payment authorization token without decrypting the encrypted payment authorization token;
verifying that the encrypted payment authorization token specifies a payment amount corresponding to the portion of the transaction based on the analyzing; and
transmitting the encrypted payment authorization token to the payment provider server to complete the transaction.

2. The system of claim 1, wherein the portion of the transaction and the encrypted payment authorization token are transmitted between the first user device and the second user device using peer-to-peer communications.

3. The system of claim 1, wherein the determining the one or more user devices comprises detecting the second user device within a predetermined distance from the first user device.

4. The system of claim 1, wherein the determining the portion of the transaction is based on an assignment by the first user.

5. The system of claim 1, wherein the portion of the transaction comprises a percentage of a cost for the transaction.

6. The system of claim 1, wherein the operations further comprise transmitting includes an authorization token request to the second user device.

7. The system of claim 1, wherein the operations further comprise:
receiving, from the second user device, an indication of a revision to the portion of the transaction assigned to the at least second user device, wherein the payment amount corresponds to the revision to the portion of the transaction.

8. A method comprising:
receiving, by a computer system, an image captured for a transaction via a first user device associated with a first user;
determining one or more user devices comprising a second user device associated with the transaction;
assigning a portion of the transaction to a second user associated with second user device;
transmitting data associated with the portion of the transaction to the second device;
receiving, from the second device, a payment authorization token that authorizes payment to a user account with a payment provider server;
analyzing, by the computer system, the payment authorization token without decrypting the payment authorization token;
verifying that the payment authorization token specifies a payment amount corresponding to the portion of the transaction based on the analyzing; and
in response to the verifying, transmitting the payment authorization token to the payment provider server.

9. The method of claim 8, wherein the data associated with the portion of the transaction and the payment authorization token are transmitted between the first user device and the second device using peer-to-peer communications.

10. The method of claim 8, wherein the determining the one or more user devices comprises detecting the second user device within a predetermined distance from the first user device.

11. The method of claim 8, further comprising receiving, from the first user via the first user device, an input indicating an assignment of the portion of the transaction to the second user.

12. The method of claim 8, wherein the portion of the transaction comprises a percentage of a cost for the transaction.

13. The method of claim 8, further comprising transmitting an authorization token request to the second user device.

14. The method of claim 8, further comprising:
receiving, from the second user device, an indication of a revision to the portion of the transaction assigned to the second user device, wherein the payment amount corresponds to the revision to the portion of the transaction.

15. A non-transitory machine-readable medium having stored thereon machine-readable instructions executable to cause a machine to perform operations comprising:
receiving an image associated with a transaction from a first user device associated with a first user;
determining one or more user devices comprising a second user device associated with the transaction;
determining a portion of the transaction assigned to a second user associated with the second user device;
transmitting, information associated with the portion of the transaction to the second user device;
receiving, from the second user device, an encrypted payment authorization token that authorizes payment to a user account with a payment provider server;

analyzing the encrypted payment authorization token without decrypting the encrypted payment authorization token;

verifying that the encrypted payment authorization token specifies a payment amount corresponding to the portion of the transaction based on the analyzing; and transmitting the encrypted payment authorization token to the payment provider server.

16. The non-transitory machine-readable medium of claim 15, wherein the information associated with the portion of the transaction and the encrypted payment authorization token are transmitted between the first user device and the second user device using peer-to-peer communications.

17. The non-transitory machine-readable medium of claim 15, wherein the determining the one or more user devices comprises detecting the second user device within a predetermined distance from the first user device.

18. The non-transitory machine-readable medium of claim 15, wherein the determining the portion of the transaction is based on an assignment by the first user.

19. The non-transitory machine-readable medium of claim 15, wherein the portion of the transaction comprises a percentage of a cost for the transaction.

20. The non-transitory machine-readable medium of claim 15, wherein the operations further comprise transmitting an authorization token request to the second user device.

* * * * *

UNITED STATES PATENT AND TRADEMARK OFFICE
CERTIFICATE OF CORRECTION

PATENT NO. : 11,676,129 B2
APPLICATION NO. : 17/208674
DATED : June 13, 2023
INVENTOR(S) : Christopher Diebold O'Toole et al.

It is certified that error appears in the above-identified patent and that said Letters Patent is hereby corrected as shown below:

In the Claims

Claim 6, Column 17, Line 66, change "comprise transmitting includes an authorization token" to --comprise transmitting an authorization token--.

Signed and Sealed this
Eighth Day of August, 2023

Katherine Kelly Vidal
*Director of the United States Patent and Trademark Office*